US011111172B2

(12) United States Patent
Dawes et al.

(10) Patent No.: US 11,111,172 B2
(45) Date of Patent: Sep. 7, 2021

(54) BASIC ADDITIVES FOR SILICA SOOT COMPACTS AND METHODS FOR FORMING OPTICAL QUALITY GLASS

(71) Applicant: Corning Incorporated, Corning, NY (US)

(72) Inventors: Steven Bruce Dawes, Corning, NY (US); Lisa Ann Hogue, Corning, NY (US); Kenneth Edward Hrdina, Horseheads, NY (US); Srinivas Vemury, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 646 days.

(21) Appl. No.: 15/824,241

(22) Filed: Nov. 28, 2017

(65) Prior Publication Data

US 2018/0148366 A1 May 31, 2018

Related U.S. Application Data

(60) Provisional application No. 62/428,246, filed on Nov. 30, 2016.

(51) Int. Cl.
| | |
|---|---|
| *C03C 3/06* | (2006.01) |
| *C03B 37/018* | (2006.01) |
| *C03B 19/06* | (2006.01) |
| *C03B 37/012* | (2006.01) |

(52) U.S. Cl.
CPC .............. *C03C 3/06* (2013.01); *C03B 19/066* (2013.01); *C03B 37/018* (2013.01); *C03B 37/01282* (2013.01); *Y02P 40/57* (2015.11)

(58) Field of Classification Search
CPC ... C03C 3/06; C03B 19/066; C03B 37/01282; C03B 37/018; Y02P 40/57
See application file for complete search history.

(56) References Cited

U.S. PATENT DOCUMENTS

| | | | | |
|---|---|---|---|---|
| 4,775,401 | A | * | 10/1988 | Fleming ............ C03B 37/01446 65/395 |
| 4,888,036 | A | | 12/1989 | Clasen |
| 5,240,488 | A | * | 8/1993 | Chandross .............. C03B 19/12 501/12 |
| 5,562,752 | A | | 10/1996 | Fleming, Jr. |
| 5,565,014 | A | | 10/1996 | Fleming, Jr. |

(Continued)

FOREIGN PATENT DOCUMENTS

| | | |
|---|---|---|
| EP | 0129015 A2 | 12/1984 |
| EP | 0905087 A1 | 3/1999 |

(Continued)

OTHER PUBLICATIONS

Chida, T. et al., "Dissolution Rate of Colloidal Silica in Highly Alkaline Solution." Materials Researc Society Symposia Proceedings, vol. 824, pp. CC8.39.1-CC8.39.6, 2004.

(Continued)

*Primary Examiner* — Nahida Sultana
(74) *Attorney, Agent, or Firm* — Amy T. Lang (57) ABSTRACT

A method for forming an optical quality glass is provided. The method includes contacting silica soot particles with a basic additive, forming a silica soot compact, and removing the basic additive from the silica soot compact. A method of forming a cladding portion of an optical fiber preform is also provided.

20 Claims, 1 Drawing Sheet

(56) References Cited

U.S. PATENT DOCUMENTS

| | | | |
|---|---|---|---|
| 5,944,866 | A | 8/1999 | Chen et al. |
| 6,080,339 | A | 6/2000 | Fleming et al. |
| 6,132,649 | A | 10/2000 | Cauda et al. |
| 6,209,357 | B1 | 4/2001 | Bhandarkar et al. |
| 6,223,563 | B1 | 5/2001 | Bahr, Jr. et al. |
| 6,291,377 | B1 * | 9/2001 | Komine ............... C03B 19/14 501/54 |
| 6,343,490 | B1 | 2/2002 | Alonzo et al. |
| 6,442,977 | B1 | 9/2002 | Bhandarkar et al. |
| 6,699,808 | B1 | 3/2004 | Schwertfeger et al. |
| 6,807,823 | B2 * | 10/2004 | Ohga ............... C03B 19/1423 501/54 |
| 8,578,736 | B2 | 11/2013 | Dawes et al. |
| 2003/0039865 | A1 * | 2/2003 | Kelsey ............... C03C 3/06 428/696 |
| 2003/0121283 | A1 * | 7/2003 | Yu ............... C03B 19/06 65/17.2 |
| 2004/0053767 | A1 | 3/2004 | Schwertfeger et al. |
| 2010/0107700 | A1 | 5/2010 | Dawes et al. |
| 2010/0323873 | A1 * | 12/2010 | Koike ............... C03B 19/1461 501/53 |
| 2012/0238434 | A1 * | 9/2012 | Koike ............... C03B 19/1453 501/54 |
| 2016/0115070 | A1 | 4/2016 | Dawes et al. |
| 2016/0251252 | A1 * | 9/2016 | Clinton ............... C03B 19/066 264/1.24 |

FOREIGN PATENT DOCUMENTS

| | | |
|---|---|---|
| EP | 0905093 A1 | 3/1999 |
| EP | 0974557 A1 | 1/2000 |
| EP | 1061050 A1 | 12/2000 |
| EP | 1167308 A1 | 1/2002 |
| WO | 2002026647 A1 | 4/2002 |
| WO | 2016064954 A1 | 4/2016 |
| WO | 2017103171 A1 | 6/2017 |

OTHER PUBLICATIONS

Iler, R., The Chemistry of Silica: Solubility, Polymerization, Colloid and Surface Properties, and Biochemistry, John Wiley & Sons, pp. 40-53, Jun. 1979.

Lampenscherf, S. et al., "Stress Development Due to Capillary Condensation in Powder Compacts: A Two-Dimensional Model Study." Journal of American Ceramic Society, vol. 83, No. 6, pp. 1333-1340, Jun. 2000.

Maskara, A. et al., "Agglormeration During the Drying of Fine Silica Powders, Part II: The Role of Particle Solubility." Journal of American Ceramic Society, vol. 80, No. 7, pp. 1715-1722, Jul. 1997.

International Search Report and Written Opinion of the International Searching Authority; PCT/US2017/063584 dated Feb. 16, 2018; 15 Pages; European Patent Office.

\* cited by examiner

BASIC ADDITIVES FOR SILICA SOOT COMPACTS AND METHODS FOR FORMING OPTICAL QUALITY GLASS

CROSS-REFERENCE TO RELATED APPLICATIONS

This application claims the benefit of priority of U.S. Provisional Application Ser. No. 62/428,246 filed on Nov. 30, 2016 the contents of which are relied upon and incorporated herein by reference in their entirety as if fully set forth below.

FIELD

The present disclosure relates generally to methods for forming optical quality glass, and in particular, to methods for forming silica soot compacts.

BACKGROUND

High purity silica powder, or silica soot, is produced in processes that make high optical transmission. In optical fiber manufacturing, silica powder is manufactured via flame hydrolysis of silicon halides such as SiCl4, or via flame combustion of organic containing silica species such as Octamethylcyclotetrasiloxane (OMCTS). Conventional chemical vapor deposition (CVD) processes for making optical fiber preforms, such as outside vapor deposition (OVD) and vapor axial deposition (VAD) processes, collect the soot particles on a blank, but often utilize only a portion of the starting raw material due to limitations in the deposition efficiency of the processes. The remainder of the silica soot can be collected in clean baghouses, where the purity of the silica is maintained. Use of the "waste" silica soot in forming optical quality glass could, therefore, potentially result in significant raw material cost savings to optical fiber manufacturing.

Alternatively, silica soot can be produced as a loose powder with nearly 100% collection efficiency in baghouses systems, where variations in the production parameters allow for control of purity and surface area, which can range between about 20 and 400 $m^2/g$. Soot collected in this process could also be used to form optical fiber blanks, or part of such blanks, while lowering the cost of production.

Different methods have been devised to utilize silica soot in the production of optical quality glass. These methods, which include, for example, sol-gel (and other "wet") processes, can suffer from a variety of drawbacks including expensive, complicated, and/or time consuming processing conditions and equipment, and may result in soot compacts with less than desirable properties such as unacceptable variability with respect to compact density and geometry. These less than desirable properties adversely affect compact strength and can result in cracking, breaking or other types of soot compact failure.

Alternatively, the soot collected from a generation process can be formed into a unitary body by providing pressure within a confined space, either as a free standing part, or positions onto a substrate. The cohesive interaction between soot particles compacted under pressure provides a porous compact that can be sintered to a high purity glass. This method can suffer from low strength that is obtained after the compaction. While the compact holds its shape and can be carefully moved and processes, small stresses can lead to cracking, for example while handing the part, or if pressed onto a substrate when differential shrinkage induces a stress.

According to one method, soot compact strength may be improved by increasing the water content in a silica soot sample. However, as water is volatile, and can be difficult to distribute throughout the silica soot sample, even an initially well distributed water supply is subject to drying and loss of cohesive strength over time. As a result of compaction that occurs as the meniscus force of the drying draws particles together, agglomerates that retain high density in the silica soot, or hard agglomerates, are formed. Hard agglomerates may adversely affect soot compact strength and may lead to the formation of pores in the resultant glass.

Organic additives may also be effective in strengthening soot compacts. Recalling that high purity is required, it is difficult to blend an organic binder without incorporating more than ppm levels of alkali metals, which can induced crystallization in the glass during the sintering process. In addition, removal of organic additives from high purity silica soot can be difficult to achieve and may necessitate additional high temperature processing steps. If unsuccessfully removed, the organic additives may become trapped in the silica soot through consolidation and may form pores in the resultant glass. Still other additives that may improve soot compact strength require a high temperature active oxidation or chlorination to be removed from the silica soot. At the temperatures required for removal, these additives may interact with the silica surface of the silica soot and initiate irreversible crystallization.

What is needed is a method of increasing the strength of pressed soot bodies so as to enable them to resist cracking under the stresses encountered in handling and thermal processing, while maintaining the purity required to achieve a high quality optically transmissive glass.

SUMMARY

According to an embodiment of the present disclosure, a method for forming an optical quality glass is provided. The method includes contacting silica soot particles with a basic additive, forming a silica soot compact, and removing the basic additive from the silica soot compact.

According to another embodiment of the present disclosure, a method of forming a cladding portion of an optical fiber preform is provided. The method includes positioning a partially manufactured optical fiber preform in an inner cavity of a mold body. The method further includes contacting silica soot particles with a basic additive, and, after contacting the silica soot particles with the basic additive, loading the mold body with the silica soot particles. The method further includes compressing the silica soot particles in a radial direction to form a silica soot compact, and removing the basic additive from the silica soot compact.

According to another embodiment of the present disclosure, a method of forming a cladding portions of an optical fiber preform that can resist cracking during normal heating required to preheat or consolidate the soot to a dense glass. The method includes The method includes positioning a partially manufactured optical fiber preform in an inner cavity of a mold body. The method further includes contacting silica soot particles with a basic additive, and, after contacting the silica soot particles with the basic additive, loading the mold body with the silica soot particles. The basic additive strengthens the pressed soot body without markedly increasing the modulus of the strengthened pressed soot body, and consequently improves crack resistance during heating.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments.

According to an embodiment of the present disclosure, a method for forming an optical quality glass is provided. The method includes contacting silica soot particles with a basic additive, forming a silica soot compact, and removing the basic additive from the silica soot compact. As described herein, the term silica soot particles refers to amorphous soot particulate material made of silica or silica doped with dopants such as, but not limited to, germania, phosphorus, fluorine, titania, chlorine, and so forth. The silica soot particles may have a size of between about 0.05 micron and about 0.4 micron with an average particle size of about 0.2 micron. The particulate surface area of the silica-based soot particles may be greater than about 15 m$^2$/g, more preferably greater than about 17 m$^2$/g, even more preferably greater than about 20 m$^2$/g, and even greater than about 50 m$^2$/g. The particulate surface areas may be as high as about 250 m$^2$/g or more. The silica soot particles may contain greater than about 0.1 wt. % water, but not more than about 5.0 wt. % water.

Embodiments of the present disclosure include contacting silica soot particles with a basic additive. Contacting silica soot particles with a basic additive may include physically mixing the basic additive with the silica soot particles, wherein the basic additive is a mixed solid. Alternatively, contacting silica soot particles with a basic additive may include distributing the basic additive within the silica soot particles by virtue of vaporization of the additive. As another alternative, contacting silica soot particles with a basic additive may include injection or dry spraying a solution including the basic additive onto the silica soot particles during, for example, a collection step of a silica soot generation process or a collection step of a CVD process. Regardless of the technique used, contacting silica soot particles with a basic additive forms base-treated silica soot particles.

The pH of the silica soot particles, either base-treated or not, may be determined by forming an aqueous dispersion of silica soot particles in water. Contacting silica soot particles with a basic additive increases the pH of the capillary water associated with the silica soot particles. The pH of an aqueous dispersion having only silica soot particles (non-based-treated silica soot particles) is between about 4 and about 5. A basic additive, as described herein, refers to an additive that provides a pH of the greater than 7 in an aqueous dispersion having base-treated silica soot particles. According to embodiments of the present disclosure, the pH of the aqueous dispersion having base-treated silica soot particles may be between about 7.0 and about 10. For example, the pH of the aqueous dispersion having base-treated silica soot particles may be between about 7.5 and about 9.5, or even between about 8.0 and about 9.0. For purposes of the present disclosure, pH of an aqueous dispersion may be measured by forming a mixture having about 80% deionized water with the remainder being the base-treated silica soot particles and immersing a pH electrode into the mixture. The pH electrode may be a single or dual glass electrode. Where the fluidity of the mixture is too low to obtain a pH measurement, stepwise additions of equal volumes of deionized water (such as about 1.0 wt. % deionized water) may be performed until the viscosity of the mixture is less than about 500 cps at a shear rate of 28 s$^{-1}$. At such a viscosity, a pH electrode can be immersed in the mixture and the pH of the mixture can be measured.

The basic additive may be chosen to provide increased strength to the resulting soot compacts, which in turn reduces compact failure resulting from handling and processing of the soot compacts. The basic additive may also be chosen to prevent contamination of the soot compact and the resultant glass produced from the soot compact. Furthermore, the basic additive may be chosen based on ease of removal. In other terms, the basic additive may be removed from the soot compact without requiring additional high temperature process steps.

The basic additive may be an ionic compound such as an ammonium salt, a sodium salt, or a potassium salt. Applicable additives include, but are not limited to, ammonium carbonate, ammonium bicarbonate, ammonium hydroxide, sodium carbonate, sodium bicarbonate, sodium hydroxide and potassium hydroxide. The basic additives may be volatile additives, or may be non-volatile additives. As used herein, the term "volatile additive" refers to a compound that has relatively high enough vapor pressure under normal conditions to significantly vaporize and to enter the atmosphere. A volatile additive is a compound having a vapor pressure of greater than about 5 mmHg at a temperature of 20° C. According to embodiments of the present disclosure, such volatile additives may be, but are not limited to, ammonium carbonate, ammonium bicarbonate and ammonium hydroxide. As used herein, the term "non-volatile additive" refers to a compound that has relatively low enough vapor pressure under normal conditions to not significantly vaporize or enter the atmosphere. A non-volatile additive is a compound having a vapor pressure of less than about 5 mmHg at a temperature of 20° C. According to embodiments of the present disclosure, such non-volatile additives may be, but are not limited to, sodium carbonate, sodium bicarbonate, sodium hydroxide and potassium hydroxide. The basic additive may also be a gas. For example, the gas may be an ammonia-containing gas.

Unless otherwise specially noted, the term "ppm" as used herein generally refers to parts per million based on weight, and a measurement in wt % can be converted to ppm by multiplying by a factor of 10,000.

The basic additive may be added to the silica soot particles in concentrations of between about 1 ppm and about 2500 ppm, or between about 10 ppm and about 2000 ppm. Alternatively, the basic additive may be added in concentrations of between about 50 ppm and about 1500 ppm, or even between about 100 ppm and about 1000 ppm.

The basic additive may be added to the silica soot particles at any time prior to the formation of the silica soot compact. For example, the basic additive may be added while the silica soot particles are being collected in a baghouse, after the silica soot particles have been collected from the baghouse in a large scale container, or at a smaller scale while the silica soot particles are being prepared for formation of the silica soot compact.

The basic additive may be added to the silica soot particles in discrete crystal form, such as by being brought into physical contact with the silica soot particles in the absence of a solvent. Preferably, but not meant to be limiting, a volatile additive is added to the silica soot particles in discrete crystal form to exploit the volatile additive's propensity to vaporize, which in turn results in further contact between the silica soot particles and the basic additive in the vapor phase. Alternatively, the basic additive may be added to the silica soot particles as a gas. The silica soot particles may be positioned in a closed system such as a chamber or an oven, or the silica soot particles may be positioned in an open system where the gas is flowed over or through the silica soot particles. Gas flow rates, exposure time and concentrations can be adjusted to yield the desired increased pH values. As yet another alternative, the basic additive may be brought into contact with silica soot particles through the addition of a basic solution to the silica soot particles. Preferably, but not meant to be limiting, a non-volatile additive is added to the silica soot particles in solution to account for the non-volatile additive's lack of propensity (as compared to a volatile additive) to vaporize.

According to embodiments of the present disclosure, the silica soot particles may be contacted with the basic solution in proportions that maintain the free flowing state of the silica soot particles. Maintaining the free flowing state of the silica soot particles includes adding the basic solution in concentrations of less than about 5.0% by weight of the silica soot particles. By contacting the silica soot particles with a vaporized mist of the basic solution, it may be possible to control contact between of the silica soot particles and the basic solution such that no portion of the silica soot particles comprises more than about 5.0 wt. % of the basic solution.

Once the basic additive is added, heat may be applied to facilitate additional distribution of the additive on the silica soot particles. Such heat may be applied with the silica soot particles in a closed system such as a chamber or an oven. According to an embodiment of the present disclosure, the silica soot particles containing the basic additive may be heated to a temperature of less than about 250° C., and thereafter cooled. In yet another embodiment, the silica soot particles containing the basic additive may be heated to a temperature of between about 100° C. and about 200° C., and thereafter cooled. In embodiments where the basic additive is added while the silica soot particles are collected in, for example, a collection step of a silica soot generation process or a collection step of a CVD process, it is believed that the collection conditions may provide the heat necessary to facilitate additional distribution of the additive on the silica soot particles.

Embodiments of the present disclosure further include forming a silica soot compact. As one non-limiting example, base-treated silica soot particles may be loaded into a stainless steel mold having a cavity. The inside surface of the steel mold is polished, and snug fitting steel rams having dimensions which allow the rams to enter the mold cavity are positioned at either side of the mold cavity. The rams are configured to apply a compaction pressure to the base-treated silica soot particles. Such compaction pressure may be adjusted to control the density of the resulting silica soot compact. The compaction pressure is held for a period of time suitable for the formation of the silica soot compact and is then released. After the compaction pressure is released, the silica soot compact is ejected by removing one of the rams from the mold cavity and lightly pushing the silica soot compact out of the mold cavity with the other of the rams.

Embodiments of the present disclosure further include removing the basic additive from the silica soot compact. For example, the basic additive may be removed from the silica soot compact once all processing steps that require increased strength have been completed. Processing steps that require increased strength may be, but are not limited to, lifting the silica soot compact from a mold, transporting the compact from one position to another, mounting the compact on a transport device and placing the compact into a heated furnace. Removing the basic additive may include heating the silica soot compact to induce a controlled vaporization of the basic additive, which may also achieve a residue free removal. By inducing a controlled vaporization, it is meant that the basic additive is removed at a rate that produces minimal internal pressure to the silica soot compact and that avoids formation of internal fractures in the silica soot compact. The basic additive may be removed by heating the silica soot compact to a temperature above about 200° C. at a rate of less than about 10° C. per minute. The silica soot compact may be heated to a temperature above about 200° C. at a rate of about 1° C. to about 5° C. per minute. Heating of the silica soot compact may be done in air or nitrogen-rich atmospheres.

Optionally, removing the basic additive from the silica soot compact may further include chemically cleaning the silica soot compact. Chemically cleaning the silica soot compact may include heating the silica soot compact in a chemical agent at temperatures of between about 800° C. and about 1000° C. According to embodiments of the present disclosure, the chemical agent may be for example, but not limited to, $Cl_2$, $SiCl_4$, $SOCl_2$, or any chemical agent known in the art to volatilize basic additives. Without intending to limit the present disclosure, chemically cleaning the silica soot compact may be most advantageous when the silica soot compact is formed from silica soot particles treated with a non-volatile additive.

The density of the silica soot compacts described herein is lower than the density of silica soot compacts formed without a basic additive when pressed to the same compaction pressure. The density is low enough to prevent the adverse effects of pore formation in resultant glass, but high enough to provide adequate yields of resultant glass from the silica soot compacts. According to embodiments of the present disclosure, the silica soot compact may have a density of less than about $1.00 \text{ g/cm}^3$. For example, the silica soot compact may have a density of between about $0.40 \text{ g/cm}^3$ and about $0.90 \text{ g/cm}^3$, or even between about $0.60 \text{ g/cm}^3$ and about $0.85 \text{ g/cm}^3$.

Silica soot compacts formed in accordance with embodiments of the present disclosure have increased strength as compared to silica soot compacts formed from silica soot particles alone. Without wishing to be bound by any particular theory, it was observed that silica soot compacts formed in accordance with embodiments of the present disclosure do not increase in elastic modulus as compared to silica soot compacts formed from silica soot particles alone. As a result the soot compact is better able to resist cracking under a strain. Such increased strength results in reduced compact failure resulting from handling and processing of the silica soot compacts. Silica soot compacts formed in accordance with embodiments of the present disclosure may have a tensile strength 50% greater than silica soot compacts formed from silica soot particles alone. Silica soot compacts formed in accordance with embodiments of the present disclosure may have a tensile strength 70% greater than silica soot compacts formed from silica soot particles alone. Silica soot compacts formed in accordance with embodiments of the present disclosure may have a tensile strength 100% greater than silica soot compacts formed from silica soot particles alone. For example, silica soot compacts formed in accordance with embodiments of the present disclosure may have a tensile strength between about 50% and about 125% greater than silica soot compacts formed from silica soot particles alone. In addition, silica soot compacts formed in accordance with embodiments of the present disclosure may have a tensile strength up to about 150% greater than silica soot compacts formed from silica soot particles alone. Silica soot compacts formed in accordance with embodiments of the present disclosure may have a tensile modulus of between about 0% and about 40% greater than silica soot compacts formed from silica soot particles alone. As one non-limiting example, silica soot compacts formed in accordance with embodiments of the present disclosure had a tensile strength about 100% greater than silica soot compacts formed from silica soot particles alone and were found to have a tensile modulus that was within about 10% of the tensile modulus of silica soot compacts formed from silica soot particles alone.

Silica soot compacts formed in accordance with embodiments of the present disclosure also have increased strength when exposed to increased temperatures as compared to silica soot compacts formed from silica soot particles alone. When exposed to temperatures above about 200° C., silica soot compacts formed in accordance with embodiments of the present disclosure may have a tensile strength 90% greater than silica soot compacts formed from silica soot particles alone. When exposed to temperatures above about 200° C., silica soot compacts formed in accordance with embodiments of the present disclosure may have a tensile strength 150% greater than silica soot compacts formed from silica soot particles alone. When exposed to temperatures above about 200° C., silica soot compacts formed in accordance with embodiments of the present disclosure may have a tensile strength 200% greater than silica soot compacts formed from silica soot particles alone. For example, when exposed to temperatures above about 200° C. silica soot compacts formed in accordance with embodiments of the present disclosure may have a tensile strength between about 90% and about 275% greater than silica soot compacts formed from silica soot particles alone.

Similarly, silica soot compacts formed in accordance with embodiments of the present disclosure also have increased strength when exposed to increased temperatures as compared to the strength of the same silica soot compact at room temperature. When exposed to temperatures above about 200° C., silica soot compacts formed in accordance with embodiments of the present disclosure may have a tensile strength 5% greater than the same silica soot compact at room temperature. When exposed to temperatures above about 200° C., silica soot compacts formed in accordance with embodiments of the present disclosure may have a tensile strength 15% greater than the same silica soot compact at room temperature. When exposed to temperatures above about 200° C., silica soot compacts formed in accordance with embodiments of the present disclosure may have a tensile strength 20% greater than the same silica soot compact at room temperature. For example, when exposed to temperatures above about 200° C. silica soot compacts formed in accordance with embodiments of the present disclosure may have a tensile strength between about 5% and about 50% greater than the same silica soot compact at room temperature.

According to embodiments of the present disclosure, the silica soot compact may be sintered to form a glass article. The silica soot compact may be heated to a sintering temperature between about 1200° C. and about 1550° C. and maintained at the sintering temperature until the silica soot compact is consolidated into a glass article. Glass articles formed from silica soot compacts formed in accordance with embodiments of the present disclosure is of a good quality which is characterized by high clarity and the fact that the glass has either no seeds or few seeds having a diameter of less than about 50 microns.

Figure 1:
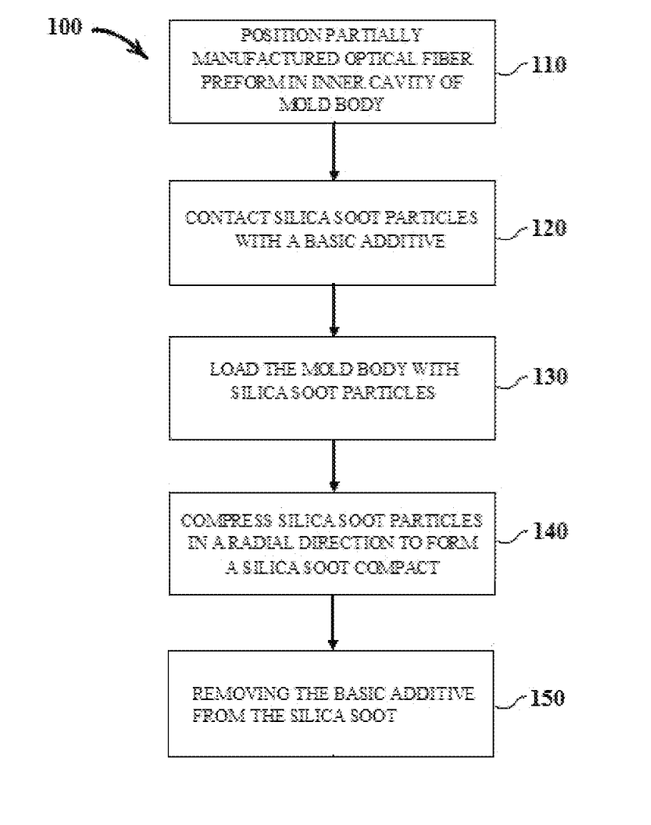
FIG. 1 illustrates a method of forming a cladding portion of an optical fiber preform in accordance with embodiments of the present disclosure.

The silica soot particles disclosed herein may serve as precursors to optical quality glass. The silica soot particles may be pressed over the outer layer of a substrate to form at least a portion of an optical fiber preform to form a cladding portion of the optical fiber preform. As shown in FIG. 1, a method 100 for forming an optical fiber preform may include positioning 110 a partially manufactured consolidated or unconsolidated silica glass preform into an inner cavity of a mold body. The partially manufactured preform may include a soot region deposited via chemical vapor deposition processes such as OVD or VAD. The method 100 further includes contacting 120 silica soot particles with a basic additive and loading 130 the mold body with the silica soot particles. Silica soot particles may be deposited into the inner cavity between the partially manufactured preform and an inner wall of the mold body. The method 100 further includes compressing 140 the silica soot particles in a radial direction to form a silica soot compact. A radially inward pressure may be applied against the particulate glass material to pressurize the particulate glass material against the soot region on the partially manufactured preform. Pressing methods and apparatuses disclosed in U.S. Pat. No. 8,578,736 and U.S. Publication No. 2010/0107700, the specifications of which are incorporated by reference in their entirety, may be employed. The method 100 further includes removing 150 the basic additive from the silica soot compact.

It has been discovered that embodiments of the present disclosure provide ways to contact basic additives with silica soot particles that do not adversely affect the pore structure of a silica soot compact formed from the silica soot particles. The basic additives described herein can be removed from the silica soot compact at low temperatures such that outgassing, increased internal pressure, and other adverse consequences of high temperature processing of silica soot compacts can be avoided. Also the ability to remove the additive eliminates the possibility of a residue remaining in the silica soot compact that might affect the quality of the glass formed from the silica soot compact. Without wishing to be bound by any particular theory, it is believed that the basic additives promote higher levels of solubility of silica in the capillary water which then precipitates at the junction between formerly discrete particles. In essence, a type of tack welding occurs at any silica joints as a result of a dissolution/transport and precipitation process.

A surprising result was noted in the course of experimentation. In the embodiments described above, increased compact strength with unchanged compact elastic modulus was achieved by contacting a basic additive prior to forming the compact under pressure. The ratio of strength to modulus increased by up to 6 fold, and that ratio was maintained throughout strength testing at temperatures ranging from 25° C. to 400° C. The strengthened body was able to be processed on substrate articles without cracking. Other experiments were conducted wherein a soot compact was formed without basic additives, and after forming was exposed to basic additives. In this case a substantial strengthening effect was achieved, but the elastic modulus increased in proportion to the strength, so that the strength to modulus ratio did not vary substantially from the untreated soot compact. The strengthened body formed in this way was not able to avoid cracking, and in fact general failed with catastrophic damage than an untreated part.

EXAMPLE

Embodiments of the present disclosure are further described below with respect to certain exemplary and specific embodiments thereof, which are illustrative only and not intended to be limiting.

In the examples below, glass quality is categorized in terms of visual characterization of consolidated samples. Consolidated glass of uniform opacity is called "opaque"; glass with localized opacity is called "poor", wherein localized opacity is characterized as any white hazy inclusions and/or seeds of dimension greater than about 1.0 mm; glass free of localized opacity but containing seeds with a diameter greater than about 50 microns is called "fair"; and glass that is clear with no seeds or few seeds having a diameter of less than about 50 microns is called "good".

TABLE I

| Sample No. | As Pressed Tensile Strength (psi) | 200° C. Tensile Strength (psi) | 400° C. Tensile Strength (psi) |
|---|---|---|---|
| 1 | 4.4 | 3.4 | 3.8 |
| 2 | 5.5 | 5.5 | 9.1 |
| 3 | 8.5 | 8.4 | 7.3 |
| 4 | 8.5 | 8.4 | 8 |
| 5 | 8.3 | 8.4 | 7.3 |
| 6 | 7.5 | 9.1 | 9.1 |
| 7 | 9.8 | 10.5 | 10.5 |
| 8 | 9.2 | 12.9 | 11.7 |
| 9 | 5.7 | 6.0 | 7.0 |
| 10 | 5.7 | 8.4 | 7.5 |
| 11 | 5.8 | 7.4 | 8.0 |
| 12 | 8.8 | 7.0 | N/A |

TABLE II

| Sample No. | 25° C. modulus (Kpsi) | 200° C. modulus (Kpsi) | 400° C. modulus (Kpsi) | pH | Density (g/cm³) |
|---|---|---|---|---|---|
| 1 | 0.443 | 0.631 | 0.647 | 4.1 | 0.90 |
| 2 | N/A | N/A | N/A | 8.1 | 0.75 |
| 3 | 0.447 | 1.005 | 0.613 | 7.5 | 0.75 |
| 4 | 0.418 | 0.501 | 0.858 | 7.8 | 0.75 |
| 5 | 0.463 | 0.678 | 0.584 | 7.5 | 0.75 |
| 6 | 0.392 | 0.837 | 0.762 | 8.9 | 0.75 |
| 7 | 0.523 | 0.787 | 0.849 | 8.9 | 0.75 |
| 8 | 0.696 | 0.985 | 0.996 | 9.2 | 0.75 |
| 9 | 87 | 184 | 125 | 11.1 | 0.78 |
| 10 | 65 | 88 | 75 | 11.7 | 0.63 |
| 11 | 64 | 81 | 85 | 11.9 | 0.63 |
| 12 | N/A | N/A | N/A | 8.1 | N/A |

Dry Baseline: Sample 1

About 100 grams of dry silica soot particles having a particle size of between about 0.05 micron and about 0.4 micron and a particulate surface area of about 22 $m^2/g$ was placed in a rolling container. The container was placed on a roller mill and was rolled for about 15 minutes. After rolling, a portion of the silica soot particles was dispersed in water to form a slurry and the pH of the slurry was measured. The measured pH is included in Table II.

An MTS Insight Electromechanical Testing System (commercially available from MTS Systems Corporation, Eden Prairie, Minn.) was used to make pellets using the silica soot by applying a force of about 150 pounds for a time of about 3.0 minutes. Cylindrical pellets having a mass of about 3.2 grams, a diameter of about 1.125 inches and a height of about 0.25 inches were formed. The density of each of the pellets was determined and the density values are reported in Table II. The formed pellets were crushed in a diametral compression test in which the pellets were positioned on edge with the top and bottom faces of the cylindrical pellets perpendicular to parallel test platens. A first set of pellets were crushed in a compression test as formed. A second set of pellets were cooled to room temperature after being exposed to a temperature of about 200° C. for about 1 hour and then crushed in a compression test. A third set of pellets were cooled to room temperature after being exposed to a temperature of about 400° C. for about 1 hour and then crushed in a compression test. Each set of pellets contained three pellets that were crushed in a diametral compression test to ensure reproducibility of the sample data. Results of the diametral compression tests are included in Table I. The compression tests showed that the baseline sample decreased in strength with increased exposure temperatures. The modulus of the material was also determined by calculating the stress at failure by the strain (in % of length deformed at failure). The measured modulus is included in Table II. As shown in Table II, it was observed that the modulus of the baseline soot compacts increased with increased temperature.

A pellet from Sample 1 was heated to a temperature above 1200° C. and sintered to form a consolidated glass article. The consolidated glass article was observed to have good glass quality, characterized by high clarity and only a small numbers of microscopic seeds.

Exposure to Softened Water: Sample 2

About 100 grams of dry silica soot particles having a particle size of between about 0.05 micron and about 0.4 micron and a particulate surface area of about 22 m²/g was exposed to a spray of softened water. The silica soot particles treated with the softened water was determined to contain about 300 ppm sodium and about 100 ppm calcium. A 20 gram sample of the silica soot particles treated with the softened water was dispersed in water to form a slurry and the pH of the slurry was measured. The measured pH is included in Table II.

Cylindrical pellets were formed in the same manner as in Sample 1. The density of each of the pellets was determined and the density values are reported in Table II. The formed pellets were crushed in the same manner as in Sample 1. The average strengths determined by the compression tests are included in Table I. For Sample 2, the compression tests showed that the samples had either similar strength, or increased strength with increased exposure temperatures. Pellets that were crushed in a compression test as formed showed about a 25% increase in strength as compared to Sample 1. Pellets that were cooled to room temperature after being exposed to a temperature of about 200° C. showed about a 62% increase in strength as compared to Sample 1. Pellets that were cooled to room temperature after being exposed to a temperature of about 400° C. showed about a 140% increase in strength as compared to Sample 1.

A pellet from Sample 2 was heated to a temperature above 1200° C. and sintered to form a consolidated glass article. The consolidated glass article was observed to have fair glass quality with high clarity, but contained many microscopic seeds.

Dry Exposure to Ammonium Carbonate Powder: Samples 3-8

For each of Samples 3-8, about 100 grams of dry silica soot particles having a particle size of between about 0.05 micron and about 0.4 micron and a particulate surface area of about 22 m²/g was physically contacted with a solid base, in these cases ammonium carbonate ($(NH4)_2CO_3$) powder, in the absence of a solvent and placed in a rolling container. For each sample, a different weighed amount of ammonium carbonate powder, as shown in Table III, was added to the silica soot particles to achieve a predetermined concentration of ammonia ($NH_3$), also shown in Table III. The amount of ammonium carbonate was chosen to provide different amounts of ammonia ($NH_3$) in the silica soot particles ranging from 100 ppm to 5000 ppm. Based on the molecular weights of the components, about 2.82 g of ammonium carbonate salt is required to provide about 1.0 g of ammonia. The container was placed on a roller mill and was rolled for about 15 minutes. After rolling, to characterize the treated silica soot particles, a portion of the silica soot particles of each of the samples was dispersed in water to form a slurry and the pH of the slurries was measured. The measured pH values are included in Table II.

TABLE III

| Sample No. | grams $(NH_4)_2CO_3$/100 grams silica soot | $NH_3$ (ppm) |
| --- | --- | --- |
| 3 | 0.028 | 100 |
| 4 | 0.056 | 200 |
| 5 | 0.14 | 500 |
| 6 | 0.28 | 1000 |
| 7 | 0.70 | 2500 |
| 8 | 1.40 | 5000 |

Cylindrical pellets having a mass of about 3.2 grams, a diameter of about 1.125 inches and a height of about 0.25 inches were formed in the same manner as in Sample 1. The density of each of the pellets was determined and the density values are reported in Table II. The formed pellets were crushed in a diametral compression test in which the pellets were positioned with sides of the cylinder in contact with parallel test platens. A first set of pellets were crushed in the diametral compression test as formed. A second set of pellets were cooled to room temperature after being exposed to a temperature of about 200° C. for about 1 hour and then crushed in the diametral compression test. A third set of pellets were cooled to room temperature after being exposed to a temperature of about 400° C. for about 1 hour and then crushed in the diametral compression test. Each test condition included tests on three replicate pellets to ensure reproducibility of the sample data. The average strength and modulus determined by the compression tests are included in Table I and Table II respectfully. For Samples 3-8, the compression tests showed that the samples had either similar strength, or increased strength with increased exposure temperatures. In particular, Samples 5-8 exhibited increased strength after being exposed to either one or both of the increased temperatures. Pellets of all of Samples 3-8 exhibited increased strength at each of the exposure temperatures as compared to pellets of Sample 1 that were exposed to the same temperatures. Pellets that were crushed in a compression test as formed showed increases in strength of between about 70% and about 123% as compared to Sample 1. Pellets that were cooled to room temperature after being exposed to a temperature of about 200° C. showed increases in strength of between about 147% and about 270% as compared to Sample 1. Pellets that were cooled to room temperature after being exposed to a temperature of about 400° C. showed increases in strength of between about 92% and about 208% as compared to Sample 1.

A pellet from each of Samples 3-8 was heated to a temperature above 1200° C. and sintered to form a consolidated glass article. For Sample 3, the consolidated glass article was observed to have good glass quality, characterized by high clarity and only a small numbers of microscopic seeds. For Sample 4, the consolidated glass article was observed to have good glass quality, characterized by high clarity and only a small numbers of microscopic seeds. For Sample 5, the consolidated glass article was observed to have good glass quality, characterized by high clarity and only a small numbers of microscopic seeds. The consolidated glass article for Samples 3-5 were determined to be of similar quality as the consolidated glass article of Sample 1. For Sample 6, the consolidated glass article was observed to have fair glass quality, characterized by high clarity, but contained a large number of microscopic seeds. For Sample 7, the consolidated glass article was observed to have fair glass quality, characterized by high clarity, but contained a large number of microscopic seeds and several seeds larger than about 100 microns. For Sample 8, the consolidated glass article was observed to have poor glass quality, characterized by high clarity, but contained many seeds larger than about 100 microns.

Mist Exposure to Sodium Carbonate Solution: Samples 9-11

For each of Samples 9-11, sodium carbonate was dissolved in water. For Sample 9, 5.0 ppm sodium carbonate ($Na_2CO_3$) was dissolved in water; for Sample 10, 69 ppm sodium carbonate was dissolved in water; and for Sample 11, 110 ppm sodium carbonate was dissolved in water. The resulting water was atomized using an atomizer (commercially available from TSI Inc., Shoreview, Minn.) to form a mist including water droplets having a size of much less than about 0.1 mm and having about 107 particles/cm$^3$. The mist was delivered to a tumbling chamber containing dry silica soot particles having a particle size of between about 0.05 micron and about 0.4 micron and a particulate surface area of about 22 m$^2$/g. Contact of the silica soot particles with the mist resulted in an uptake of about 1.0 wt. % water. The silica soot particles were then dried in flowing nitrogen gas until the measured water content of the silica soot particles was about 0.4 wt. %.

Cylindrical pellets were formed in the same manner as in Sample 1. The density of each of the pellets was determined and the density values are reported in Table II. The formed pellets were crushed in the same manner as in Sample 1. The average strength and modulus determined by the compression tests are included in Table I and Table II respectfully. For Samples 9-11, the compression tests showed that the samples generally had increased strength with increased exposure temperatures. Pellets of all of Samples 9-11 exhibited increased strength at each of the exposure temperatures as compared to pellets of Sample 1 that were exposed to the same temperatures. Pellets that were crushed in a compression test as formed showed increases in strength of between about 29% and about 32% as compared to Sample 1. Pellets that were cooled to room temperature after being exposed to a temperature of about 200° C. showed increases in strength of between about 76% and about 147% as compared to Sample 1. Pellets that were cooled to room temperature after being exposed to a temperature of about 400° C. showed increases in strength of between about 84% and about 111% as compared to Sample 1.

Pellets were heated and sintered in the same manner as in Sample 1 to form a consolidated glass article. For Sample 9, the consolidated glass article was observed to have good glass quality, characterized by high clarity and only a small numbers of microscopic seeds. The glass article of Sample 9 was also observed to have minimal crystallites. For Samples 10 and 11, the consolidated glass articles were observed to have poor glass quality, characterized by high clarity, but contained many seeds larger than about 100 microns. The good glass quality of Sample 9 is believed to be attributable to the particle size of the water droplets. Additionally, it is believed that the presence of minimal crystallites in the glass article of Sample 9 is attributable to the low level (relative to Samples 10 and 11) of sodium carbonate in the water used to form the mist for Sample 9.

Vapor Exposure to Ammonia-Containing Gas:
Sample 12

For Sample 12, dry silica soot particles, like those used in Sample 1, were prepared in the same manner as the dry silica soot particles of Sample 1 and cylindrical pellets having a mass of about 3.2 grams, a diameter of about 1.125 inches and a height of about 0.25 inches were formed in the same manner as in Sample 1. The pellets were then placed in a stagnant chamber and exposed to an ammonia-containing gas for 15 minutes. The molar concentration of the ammonia in the ammonia-containing gas was about 1%. The chamber also contained a relative humidity of about 75%.

After exposure to the ammonia-containing gas was complete, cylindrical pellets were formed in the same manner as in Sample 1. The formed pellets were crushed in the same manner as in Sample 1. A first set of pellets were crushed in a compression test as formed. A second set of pellets were cooled to room temperature after being exposed to a temperature of about 200° C. for about 1 hour and then crushed in a compression test. Each set of pellets contained three pellets that were crushed in a diametral compression test to ensure reproducibility of the sample data. Results of the diametral compression tests are included in Table I. The compression tests showed that the baseline sample decreased in strength with increased exposure temperatures.

A blank treated in the same manner as the silica soot particles of Sample 12 was sintered and drawn to form a consolidated glass rod. The consolidated glass rod was observed to have good glass quality, characterized by high clarity and only a small numbers of microscopic seeds.

It will be apparent to those skilled in the art that various modifications and variations can be made without departing from the spirit or scope of the present disclosure.

What is claimed is:

1. A method of forming optical quality glass, the method comprising:
    contacting silica soot particles with a basic additive such that a pH of the silica soot particles increases to between about 8.0 and about 9.0,
        the silica soot particles containing between about 0.1 wt % and about 5.0 wt % water, and
        the basic additive being in a concentration of less than about 5.0% by weight of the silica soot particles;
    forming a silica soot compact; and
    removing the basic additive from the silica soot compact, wherein the silica soot compact has a density of less than about 1.00 g/cm$^3$.

2. The method of claim 1, wherein contacting the silica soot particles with the basic additive comprises adding between about 1 ppm and about 2500 ppm of the basic additive to the silica soot particles.

3. The method of claim 1, wherein contacting the silica soot particles with the basic additive comprises adding between about 10 ppm and about 2000 ppm of the basic additive to the silica soot particles.

4. The method of claim 1, wherein contacting the silica soot particles with the basic additive comprises adding between about 50 ppm and about 1500 ppm of the basic additive to the silica soot particles.

5. The method of claim 1, wherein contacting the silica soot particles with the basic additive comprises adding between about 100 ppm and about 1000 ppm of the basic additive to the silica soot particles.

6. The method of claim 1, wherein the density of the silica soot compact is between about 0.40 g/cm$^3$ and about 0.90 g/cm$^3$.

7. The method of claim 1, wherein the density of the silica soot compact is between about 0.60 g/cm$^3$ and about 0.85 g/cm$^3$.

8. The method of claim 1, wherein the basic additive is selected from the group consisting of an ammonium salt, a sodium salt and a potassium salt.

9. The method of claim 8, wherein the basic additive is an ammonium salt selected from the group consisting of ammonium carbonate, ammonium bicarbonate, ammonium hydroxide.

10. The method of claim 8, wherein the basic additive is a sodium salt selected from the group consisting of sodium carbonate, sodium bicarbonate, sodium hydroxide.

11. The method of claim 8, wherein the basic additive is potassium hydroxide.

12. The method of claim 1, wherein the basic additive is a gas.

13. The method of claim 12, wherein the gas is an ammonia-containing gas.

14. The method of claim 1, wherein contacting the silica soot particles with the basic additive comprises contacting the silica soot particles with the basic additive in the absence of a solvent.

15. The method of claim 14, wherein contacting the silica soot particles with the basic additive in the absence of a solvent further comprises heating the silica soot particles and the basic additive.

16. The method of claim 1, wherein forming a silica soot compact comprises pressing the silica soot particles over an outer layer of a substrate to form at least a portion of an optical fiber preform.

17. The method of claim 1, wherein removing the basic additive comprises heating the silica soot compact.

18. The method of claim 17, wherein heating the silica soot compact comprises heating to a temperature above about 200° C. at a rate of less than about 10° C. per minute.

19. The method of claim 17, wherein heating the silica soot compact comprises heating to a temperature above about 200° C. at a rate of about 1° C. per minute to about 5° C. per minute.

20. The method of claim 1, further comprising sintering the silica soot compact to form a glass article.

\* \* \* \* \*

UNITED STATES PATENT AND TRADEMARK OFFICE
CERTIFICATE OF CORRECTION

PATENT NO. : 11,111,172 B2
APPLICATION NO. : 15/824241
DATED : September 7, 2021
INVENTOR(S) : Steven Bruce Dawes et al.

It is certified that error appears in the above-identified patent and that said Letters Patent is hereby corrected as shown below:

On the Title Page

In Column 2, item (56), Other Publications, Line 2, delete "Researc" and insert -- Research --, therefor.

On page 2, in Column 2, item (56), Other Publications, Line 8, delete ""Agglormeration" and insert -- "Agglomeration --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*